US010979280B2

(12) United States Patent
Kavatage et al.

(10) Patent No.: US 10,979,280 B2
(45) Date of Patent: Apr. 13, 2021

(54) MANAGING DEVICES THROUGH SECONDARY COMMUNICATION CHANNELS

(71) Applicant: AIRWATCH LLC, Atlanta, GA (US)

(72) Inventors: Mahesh Kavatage, Bangalore (IN); Niranjan Paramashivaiah, Bangalore (IN); Suman Aluvala, Bangalore (IN); Pavan Rajkumar Rangain, Bangalore (IN); Ramani Panchapakesan, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 661 days.

(21) Appl. No.: 14/864,884

(22) Filed: Sep. 25, 2015

(65) Prior Publication Data

US 2017/0048097 A1 Feb. 16, 2017

(30) Foreign Application Priority Data

Aug. 12, 2015 (IN) .......................... 4205/CHE/2015

(51) Int. Cl.
*G06F 15/16* (2006.01)
*H04L 12/24* (2006.01)
(Continued)

(52) U.S. Cl.
CPC .............. *H04L 41/04* (2013.01); *H04L 45/22* (2013.01); *H04L 51/046* (2013.01); *H04L 67/104* (2013.01)

(58) Field of Classification Search
CPC ........ H04L 41/00; H04L 41/04; H04L 67/141
(Continued)

(56) References Cited

U.S. PATENT DOCUMENTS 8,065,402 B2 * 11/2011 Chen ...................... H04L 41/06
709/220
9,684,593 B1 * 6/2017 Chen ..................... G06F 12/128
(Continued)

FOREIGN PATENT DOCUMENTS

DE 102009055187 * 6/2011

OTHER PUBLICATIONS

C. Kurth, J. Prinz and W. Kampichler, "Evaluation of SIP signaling usability in networked operations," 2005 IEEE Aerospace Conference, Big Sky, MT, 2005, pp. 1806-1815 (Year: 2005).*
(Continued)

*Primary Examiner* — Oscar A Louie
*Assistant Examiner* — Messeret F Gebre
(74) *Attorney, Agent, or Firm* — Thomas Horstemeyer, LLP

(57) ABSTRACT

Disclosed are examples of managing devices through secondary communication channels. In some examples, a management component detects an impediment with a data communication channel for a device. The data communication channel can be a primary communication channel through which the device communicates with a management service. The management component detects an event associated with the device to report to the management service. The management component generates a message specifying the event, and the management component transmits the message to the management service through the secondary communication channel.

20 Claims, 9 Drawing Sheets

(51) Int. Cl.
*H04L 12/707* (2013.01)
*H04L 12/58* (2006.01)
*H04L 29/08* (2006.01)

(58) Field of Classification Search
USPC .............................................. 709/223, 228
See application file for complete search history.

(56) References Cited

U.S. PATENT DOCUMENTS

| | | | |
|---|---|---|---|
| 10,110,455 B2* | 10/2018 | Sarangapani | H04L 9/3242 |
| 10,153,966 B1* | 12/2018 | Trundle | H04L 41/0695 |
| 2003/0163697 A1* | 8/2003 | Pabla | H04L 9/0891 |
| | | | 713/171 |
| 2005/0286435 A1* | 12/2005 | Ogawa | H04L 41/0654 |
| | | | 370/252 |
| 2006/0106823 A1* | 5/2006 | Clark | G06F 11/2005 |
| 2008/0167060 A1* | 7/2008 | Moshir | G06Q 50/34 |
| | | | 455/466 |
| 2011/0072099 A1* | 3/2011 | Harju | H04L 12/5875 |
| | | | 709/206 |
| 2011/0252144 A1* | 10/2011 | Tung | H04L 41/0663 |
| | | | 709/227 |
| 2012/0254325 A1* | 10/2012 | Majeti | H04L 51/18 |
| | | | 709/206 |
| 2013/0157699 A1* | 6/2013 | Talwar | H04L 51/38 |
| | | | 455/466 |
| 2015/0172919 A1* | 6/2015 | Basnayake | H04W 4/14 |
| | | | 455/411 |
| 2015/0295726 A1* | 10/2015 | Bland | H04L 12/189 |
| | | | 709/203 |
| 2015/0371216 A1* | 12/2015 | Olawale | G06Q 20/34 |
| | | | 705/39 |
| 2016/0373917 A1* | 12/2016 | Logue | H04L 12/2809 |

OTHER PUBLICATIONS

Perera, E., Seneviratne, A., Boreli, R., Eyrich, M., Wolf, M., & Leinmuller, T. (2005). Failover for mobile routers: A vision of resilient ambience Retrieved from https://dialog.proquest.com/professional/docview/833111204?accountid=131444 (Year: 2005).*

S. P. Raikar, H. Subramoni, K. Kandalla, J. Vienne and D. K. Panda, "Designing Network Failover and Recovery in MPI for Multi-Rail InfiniBand Clusters," 2012 IEEE 26th International Parallel and Distributed Processing Symposium Workshops & PhD Forum, Shanghai, 2012, pp. 1160-1167. (Year: 2012).*

* cited by examiner

MANAGING DEVICES THROUGH SECONDARY COMMUNICATION CHANNELS

CROSS-REFERENCE TO RELATED APPLICATIONS

Benefit is claimed under 35 U.S.C. 119(a)-(d) to Foreign application Serial No. 4205/CHE/2015 filed in India entitled "MANAGING DEVICES THROUGH SECONDARY COMMUNICATION CHANNELS", on Aug. 12, 2015, by AIRWATCH LLC, which is herein incorporated in its entirety by reference for all purposes.

BACKGROUND

Individuals can use computing devices to process and store data files. For example, an individual can use a word processing application in a computing device to create, edit, and store word processing documents. The individual can also operate the word processing application to open a file and render the content of word processing documents.

Individuals often use their computing devices to access resources associated with enterprises. For example, an employee of an organization can access the organization's computer system to perform work-related tasks. Enterprises often implement security policies to protect enterprise resources. For instance, an enterprise can restrict access to enterprise resources to computing devices that have provided authenticated credentials.

In addition, some enterprises monitor the status of computing devices that have access to enterprise resources. For example, an enterprise can determine whether a computing device is using the latest version of a malware protection service. However, an enterprise may not be able to monitor the status of a computing device if the computing device is not able to communicate with the computing device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to managing devices through secondary communication channels. In some examples, a management component in a client device can communicate with remote management service through a data communication channel, such as a broadband communication channel. The data communication channel can be a primary communication channel for communications between the management component and the management service. In this regard, the data communication channel can be the preferred communication channel for communications between the management component and the management service, even if other communication channels are available.

If the management component detects an impediment with the data communication channel, the management component can begin communicating with the management service through a secondary communication channel. In some examples, the secondary communication channel can be a short message service (SMS) communication channel. In other examples, the secondary communication channel can be a peer-to-peer communication channel.

In the following discussion, examples of systems and then components are described, followed by examples of the operation of those systems.

Figure 1:
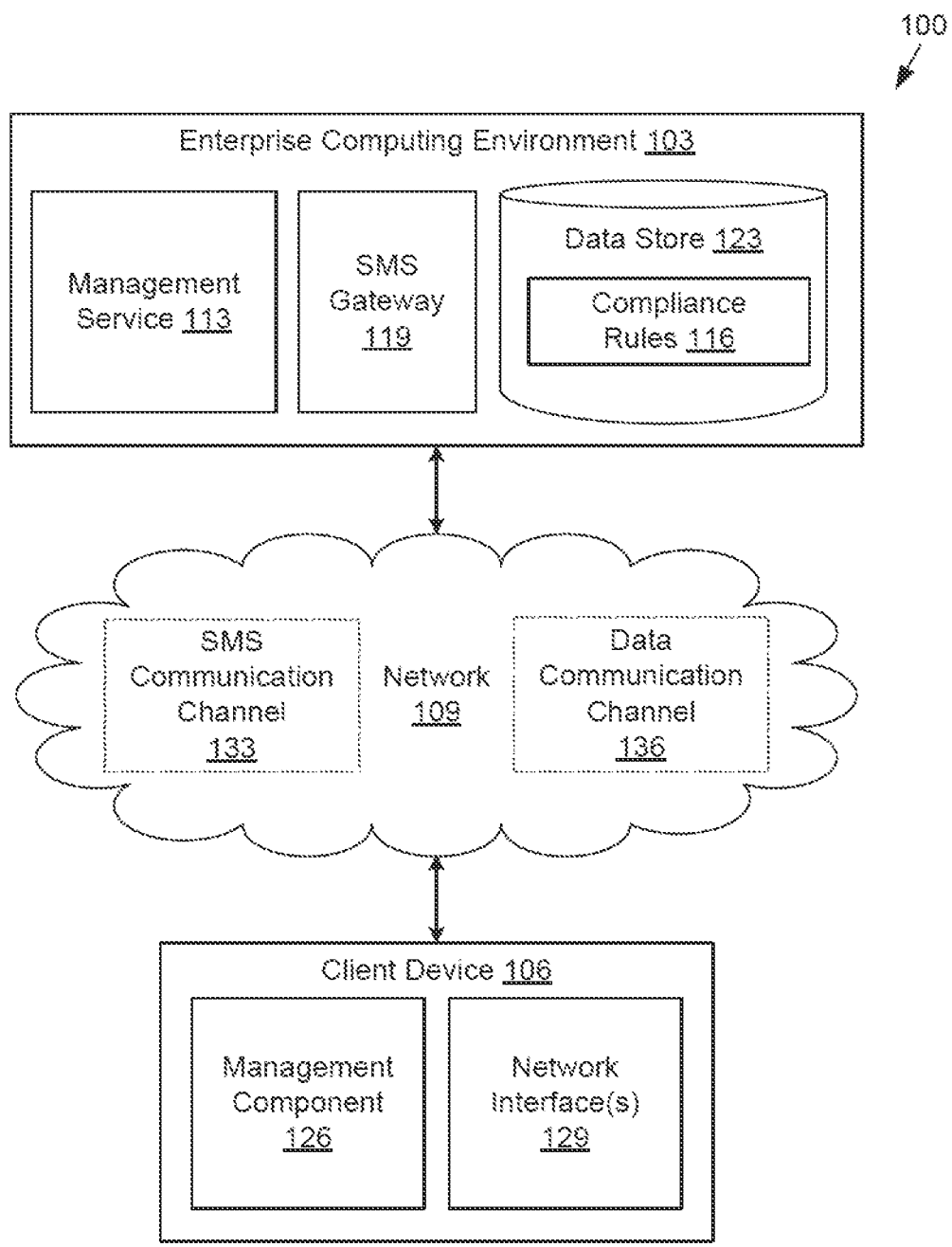
FIG. 1 is a drawing of an example of a networked environment.

With reference to FIG. 1, shown is an example of a networked environment 100. The networked environment 100 can include an enterprise computing environment 103 and a client device 106 in data communication through a network 109. The network 109 can include the Internet, one or more intranets, extranets, wide area networks (WANs), local area networks (LANs), wired networks, wireless networks, or any combination of two or more such networks. The network 109 can include satellite networks, cable networks. Ethernet networks, cellular networks, and telephony networks.

The enterprise computing environment 103 can be a computing environment operated by one or more enterprises, such as businesses or other organizations. The enterprise computing environment 103 can include a computing device, such as a server computer, that can provide computing capabilities. Alternatively, the enterprise computing environment 103 can include multiple computing devices arranged in one or more server banks or computer banks. For examples in which the enterprise computing environment 103 includes multiple computing devices, the computing devices can be located in a single installation, or the computing devices can be distributed among multiple different geographical locations.

In some examples, the enterprise computing environment 103 can include computing devices that together form a hosted computing resource or a grid computing resource. In other examples, the enterprise computing environment 103 can operate as an elastic computing resource for which the allotted capacity of computing-related resources, such as processing resources, network resources, and storage resources, can vary over time. In other examples, the enterprise computing environment 103 can include or be operated as one or more virtualized computer instances that can be executed in order to perform the functionality that is described herein.

The enterprise computing environment 103 can include various systems. For example, the enterprise computing environment 103 can include a management service 113 that can monitor and manage the operation of client devices 106 associated with the enterprise that operates the enterprise computing environment 103. In some examples, the management service 113 can manage and oversee the operation of multiple client devices 106 enrolled in a mobile device management service that is provided by the management service 113. The management service 113 can also provide the client devices 106 with access to email, calendar data, contact information, and other resources associated with the enterprise.

The management service 113 can assign various compliance rules 116 to respective client devices 106. The compliance rules 116 can specify, for example, one or more conditions that must be satisfied for a respective client device 106 to be deemed compliant with the compliance rule. In one example, a compliance rule 116 can specify that particular applications are prohibited from being installed in a client device 106. In another example, a compliance rule 116 can specify that a lock screen is required to be generated when the client device 106 is "awoken" from a low power "sleep" state and that a passcode is required, for a user to unlock the lock screen. Some compliance rules 116 can be based on time, geographical location, or network properties. For instance, a client device 106 can satisfy a compliance rule 116 when a client device 106 is located within a particular geographic location.

A client device 106 can satisfy a compliance rule 116 in another example when the client device 106 is in communication with a particular network 109, such as a particular local area network that is managed by the enterprise computing environment 103. Furthermore, a compliance rule 116 in another example can be satisfied upon the time and date matching specified values.

Another example of a compliance rule 116 involves whether a user belongs to a particular group of authorized users. A compliance rule 116 can include a whitelist or a blacklist that specifies whether particular users or groups of users are authorized users. In various examples, the enterprise computing environment 103, the client device 106, or a combination of both the enterprise computing environment 103 and the client device 106 can determine whether a client device 106 satisfies a compliance rule 116.

In some examples, an enterprise can operate the management service 113 to ensure that the client devices 106 of its users satisfy respective compliance rules 116. By ensuring that the client devices 106 of its users are operating in compliance with the compliance rules 116, the enterprise can control access to resources to thereby improve the security of devices associated with the enterprise and the users of the client devices 106.

The enterprise computing environment 103 can also include an SMS gateway 119. The SMS gateway can receive and transmit SMS messages for the management service 113, as will be described in further detail below. An SMS message can be a text message that can be transmitted at least in part through a cellular network. An SMS message can specify a destination telephone number and include a payload of a particular number of bits. In some examples, the management service 113 can be associated with a SMS short code, which can lie a telephone number for the management service 113 that has a relatively few number of digits relative to a standard telephone number. In some examples, the SMS short code for the management service 113 can be a five-digit number, and a standard telephonic number can be ten digits.

The enterprise computing environment 103 can also include a data store 123. The data store 123 is representative of multiple data stores 123 that components in the enterprise computing environment 103 can access. The data store 123 can store various data associated with the enterprise computing environment 103. For example, the data store 123 can store the compliance rules 116 that the management service 113 has assigned to the respective client devices 106.

The client device 106 is representative of multiple client devices 106 that can be coupled to the network 109. The client device 106 can include a processor-based computer system, such as a desktop computer, a laptop computer, a personal digital assistant, a mobile phone, or a tablet computer. The client device 106 can include output devices, such as a display and audio speakers, as well as one or more input devices, such as a mouse, keyboard, touch pad, or touch screen, which can facilitate a user interacting with and controlling the client device 106.

The client device 106 can also include a management component 126 and one or more network interfaces 129. The management component 126 can monitor and manage data, software components, and hardware components associated with the client device 106. The management component 126 can also identify whether the client device 196 is operating in accordance with one or more compliance rules 116 that the management service 113 has assigned to the client device 106. The management component 126 can also communicate with the management service 113, as will be described in further detail below.

In one example, the management component 126 can be a portion of an operating system for the client device 106. In another example, the management component 126 can operate in the application layer of the client device 106. For instance, the management component 126 can operate as a dedicated application that can monitor and manage data, software components, and hardware components associated with the client device 106.

In another example, the management component 126 can be a portion of an application that performs operations in addition to monitoring and managing resources. For instance, the enterprise computing environment 103 can embed the management component 126 in an application using application wrapping techniques. In alternative examples, the enterprise computing environment 103 can provide a software development kit (SDK) that a developer of an application can use to insert security libraries and other components of the management component 126 into the application.

A network interface 129 can be an interface that facilitates the client device 106 communicating through the network 109 through various communication channels, such as a SMS communication channel 133 and a data communication channel 136. The data communication channel 136 can be, for example, a broadband communication channel through which the client device 106 transmits and receives data traffic, such as Internet traffic. The SMS communication channel 133 can be a communication channel through which SMS messages are transferred.

In some examples, the data communication channel 136 can be the primary communication channel through which the management component 126 and the management service 113 communicate with each other. In this regard, even if alternative communication channels are available, the data communication channel 136 can be the preferred communication channel for traffic between the management service 113 and the management component 126. As will be described in further detail below, the SMS communication channel 133 can be a secondary communication channel through which the management component 126 and the management service 113 communicate with each other. In this regard, the management component 126 and the management service 113 can use the secondary communication channel as a backup if, for example, an impediment exists with the primary communication channel.

In some examples, a first network interface 129 can facilitate communication through an SMS communication channel 133, and a second network interface 129 can facilitate communication through a data communication channel 136. For instance, a cellular network interface can facilitate communication through the SMS communication channel 133, and a local area network (LAN) interface can facilitate communication through the data communication channel 136. Examples of cellular network interfaces for the SMS communication channel 133 include a Global System for Mobile Communications (GSM) network interface, a Third Generation Partnership Project (3GPP) network interface, and a Long-Term Evolution (LTE) network interface. Examples of a LAN interface for the data communication channel 136 include a wired Ethernet network interface and an IEEE 802.11 wireless network interface.

Next, examples of the operation of the networked environment 100 are described. To begin, the management component 126 and the management service 113 can communicate with each other through the data communication channel 136 of the network 109. For example, the management component 126 can report on the status of the client device 106, such as whether the client device 106 satisfies the compliance rules 136 that the management service 113 has assigned to the client device 106. As discussed above, the data communication channel 136 can be a primary communication channel for communications between the management component 126 and the management service 113. In this regard, the data communication channel 136 may be a preferred communication channel relative to other communications channels for communications between the management service 113 and the management component 126.

The management component 126 can detect whether there is an impediment with the data communication channel 136. Examples of an impediment include the data communication channel 136 being unavailable, the network interface 129 for the data communication channel 136 being disabled, and the data transmission or reception speed for the data communication channel 136 failing to satisfy a particular threshold speed. In some examples, the management component 126 can periodically retrieve and process parameters associated with the data communication channel 136 to determine whether an impediment exists. In other examples, the operating system of the client device 106 can notify the management component 126 that an impediment exists.

The management component 126 can also detect whether an event has occurred that should be reported to the management service 113. Examples of an event to report include the management component 126 detecting an impediment with the data communication channel 136, the client device 106 violating a compliance rule 116, a user attempting to disable the management component 126, a user removing a subscriber identity module (SIM) card from the client device 106, a user attempting to use an unapproved application, the client device 106 moving into or away from a particular geographic location, and an application being installed or uninstalled in the client device 106.

If the management component 126 has detected a reportable event and if the management component 126 has detected an impediment with the data communication channel 136, the management component 126 can report the event to the management service 113 through the SMS communication channel 133, as will now be described. As described above, the SMS communication channel 133 can be a secondary communication channel for communications between the management service 113 and the management component 126. The following description assumes that the network interface 129 for the SMS communication channel 133 is enabled. If the network interface 129 is not already enabled, the management component 126 can enable the network interface 129 for the SMS communication channel 133.

To report the detected event to the management service 113, the management component 126 can generate a payload for at least one SMS message that includes information associated with the event. In one example, the generated payload can include an encrypted payload portion that provides encrypted information associated with the detected event. For example, the encrypted payload portion can include a time stamp, an identifier for the client device 106, an identifier for the user of the client device 106, and information that describes the detected event. The encrypted portion can be encrypted using, for example, an AES256 encryption standard or a hash-based message authentication code (HMAC).

Because an SMS message can have a limited payload size, the management component 126 can also segment the encrypted payload portion into multiple segments and transmit the segments of the encrypted payload portion in separate SMS messages. Accordingly, the management component 126 can also include a message sequence portion in the respective SMS messages. The message sequence portion can specify the total number of SMS messages that the management component 126 will transmit as a sequence to report the detected event, along with an identifier that identifies where in the sequence the respective SMS messages are located. For example, the message sequence portion of a particular SMS message can specify that three SMS messages are being used to report the detected event and that the particular SMS message is the first SMS message of the three SMS messages.

To report the detected event to the management service 113, the management component 126 can transmit the one or more SMS messages to the SMS gateway 119 using a telephone number or short code for the SMS gateway 119. For examples in which the management component 126 uses a short code, the short code can be a unique short code that is assigned to only the enterprise computing environment, or the short code can be shared between multiple entities. If the short code is a shared short code, the management component 126 can include an identifier for the enterprise computing environment 103 in the SMS message so that the provider of the shared short code can route the SMS message to the SMS gateway 119 associated with the enterprise computing environment 103.

When the SMS gateway 119 receives the SMS message, the SMS gateway 119 can extract the pay load in the SMS message and provide the payload to the management service 113. If the payload is encrypted, the management service 113 can also decrypt the payload. For examples in which an event is reported using multiple SMS messages, the management service 113 can also reconstruct the event reported using the message sequence portions included in the payload of the SMS messages.

The management service 113 can analyze the extracted information that describes the reported event and determine whether the management component 126 should perform an action responsive to the reported event. If an action is required, the management service 113 can generate a command and associated data to be included in a SMS message for the management component 126. Examples of responsive actions for the management component 126 to perform include locking the client device 106, applying new compliance rules 116 or a new compliance profile, erasing data in the client device 106, rendering a message in a user interface, installing or uninstalling a particular application, performing a device reset, clearing a device passcode, modifying a passcode, restarting the client device 106, unenrolling the client device 106 from service with the management service 113, and notifying the management service 113 of the location of the client device 106.

The management service 113 can generate a payload for an SMS message that includes the command and associated data. In addition, the management service 113 can include a timestamp in the payload so that the management component 126 can determine whether a validity time for the command has expired, as will be described below. The management service 113 can also encrypt the payload using one or more of the techniques described above. In addition, for payloads that are too large for a single SMS message, the management service 113 can segment the payload so that the segmented payload can be transmitted in multiple SMS messages. Furthermore, the management service 113 can also include a message sequence portion in the payload. The message sequence portion can specify the total number of SMS messages that the management service 113 will transmit as a sequence to provide the management component 126 with the command, along with an identifier that identifies where in the sequence the respective SMS messages are located. For example, the message sequence portion of a particular SMS message can specify that two SMS messages are being used to provide the command and that the particular SMS message is the first SMS message of the two SMS messages.

Once the management service 113 has generated the payload that includes the command and any associated data, the management service 113 can provide the payload to the SMS gateway 119. The SMS gateway 119 can then transmit the SMS message to the management component 126 through the SMS communication channel 133.

When the management component 126 receives the SMS message transmitted by the SMS gateway 119, the management component 126 can extract the payload that the management service 113 generated. If the management service 113 encrypted the payload, the management component 126 can also decrypt the payload.

The management component 126 can also identify the command that the management service 113 specified in the payload, and the management component 126 can perform an action that the command specifies. Examples of actions that the command can specify include locking the client device 106, applying new compliance rules 116, erasing data in the client device 106, rendering a message in a user interface, and notifying the management service 113 of the location of the client device 106. For example, the command can specify that enterprise data be removed from the client device 106, or the user interface message can prompt that a user provide a user name and password to avoid a remedial action such as erasing enterprise data. Thus, as described above, the management component 126 can notify the management service 113 of an event by communicating through a secondary communication channel. In addition, the management service 113 can command the management component 126 to perform an action in response to the event by communicating through the secondary communication channel.

As mentioned above, the management service 113 can include a timestamp in the payload of an SMS message so that the management component 126 can determine whether the command specified in the SMS message is still valid. The management component 126 can extract the timestamp and compare the timestamp to the current time. If the difference between the timestamp and the current time exceeds a particular threshold, the management component 126 can determine that the validity time for the command has expired and therefore ignore the command specified in the SMS message. In alternative examples, instead of a timestamp, the management service 113 can explicitly specify the time when the validity time for the command expires. If the management component 126 determines that the validity time has not expired, the management component 126 can perform the action specified by the command in the SMS message.

Once the management component 126 and management service 113 establish communication using the SMS communication channel 133, the management component 126 can periodically transmit information associated with the client device 106 to the management service 113 through the SMS communication channel 133. For example, the management component 126 can transmit data specifying the location of the client device 106, a battery charge level for the client device 106, and a listing of applications installed in the client device 106. In some examples, the management service 113 can specify how often the management component 126 should transmit the information associated with the client device 106 to the management service 113 through the SMS communication channel 133. In addition, the management service 113 can specify the particular information that the management component 126 should provide to the management service 113.

Figure 2:
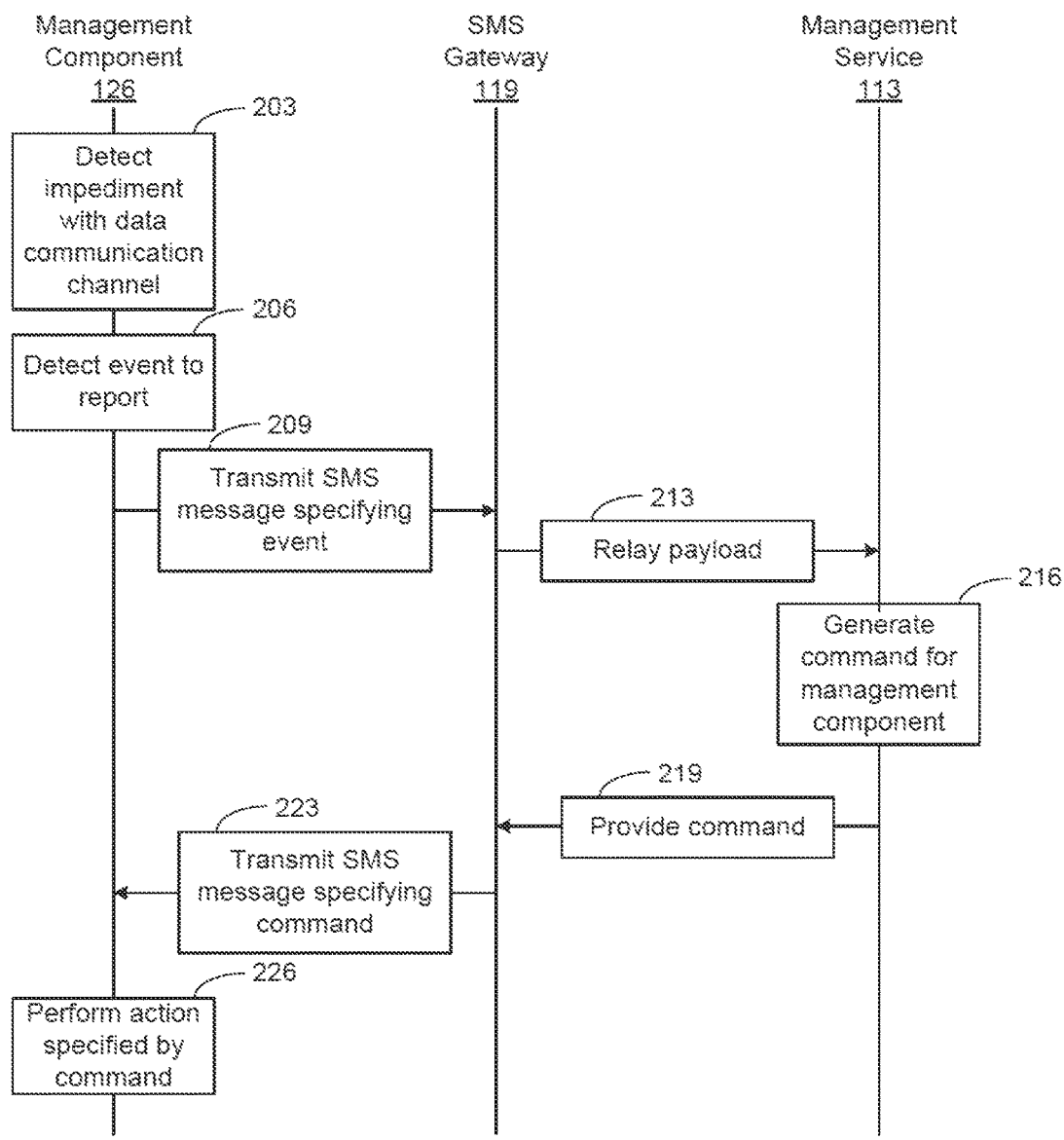
FIG. 2 is a sequence diagram illustrating an example of component interaction.

With reference to FIG. 2, shown is a sequence diagram illustrating an example of interactions of components in the networked environment 100. The sequence diagram of FIG. 2 illustrates an example of the management component 126 notifying the management service 113 of an event through the SMS communication channel 133 and the management service 113 commanding the management component 126 to perform an action.

Beginning with step 203, the management component 126 can detect an impediment with the data communication channel 136. Examples of a detected impediment include the data communication channel 136 being unavailable, the network interface 129 for the data communication channel 136 being disabled, and the data transmission or reception speed for the data communication channel 136 failing to satisfy a particular threshold speed. In some examples, the management component 126 can periodically retrieve and process parameters associated with the data communication channel 136 to determine whether an impediment exists. In other examples, the operating system of the client device 106 can notify the management component 126 that an impediment exists. The impediment can also be detected over a period of time. For example, when a data connection has been unavailable for ten minutes, it can be identified at step 203.

At step 206, the management component 126 can detect an event to report to the management service 113. Examples of an event to report include the management component 126 detecting mi impediment with the data communication channel 136, the client device 106 violating a compliance rule 116, a user attempting to disable the management component 126, a subscriber identity module (SIM) card being removed from the client device 106, a user attempting to use an unapproved application, the client device 106 moving into a restricted geographic location, and an application being installed or uninstalled in the client device 106. Step 206 can also be performed prior to step 203. This allows the management component 126 to detect violation of a compliance rule 116 or other malicious activity. A message of the activity can normally be sent using the data communication channel 136, but if the data communication channel 136 is unavailable, a secondary communication channel can be used.

As shown at step 209, the management component 126 can then transmit an SMS message through the SMS communication channel 133 to the SMS gateway 119. The SMS message can include a payload specifying the detected event. In some examples, the payload can be encrypted using an AES256 encryption standard or a hash-based message authentication code (HMAC).

When the SMS gateway 119 receives the SMS message, the SMS gateway can extract the payload and relay the payload to the management service 113, as shown at step 213. At step 216, the management service 113 can then generate a command for the management component 126. As described above the command can instruct the management component 126 to perform an action in response to the detected event. The management service 113 can then provide the command to the SMS gateway 119, as shown at step 219.

At step 223, the SMS gateway can transmit an SMS message through the SMS communication channel 133 to the management component 126. The SMS message can include a payload that specifies the command generated by the management service 113.

When the management component 126 receives the SMS message specifying the command, the management component 126 can perform an action specified by the command, as shown at step 226. Examples of actions that the management component 126 can perform include locking the client device 106, applying new compliance rules 116 or a new compliance profile, erasing data in the client device 106, rendering a message in a user interface, installing or uninstalling a particular application, performing a device reset clearing a device passcode, modifying a passcode, restarting the client device 106, unenrolling the client device 106 from service with the management service 113, erasing data in the client device 106, rendering a message in a user interface, and notifying the management service 113 of the location of the client device 106. The management component 126 can also transmit a message to the management service 113 through the SMS communication channel 133 that specifies whether the management component 126 complied with the command.

Figure 3:
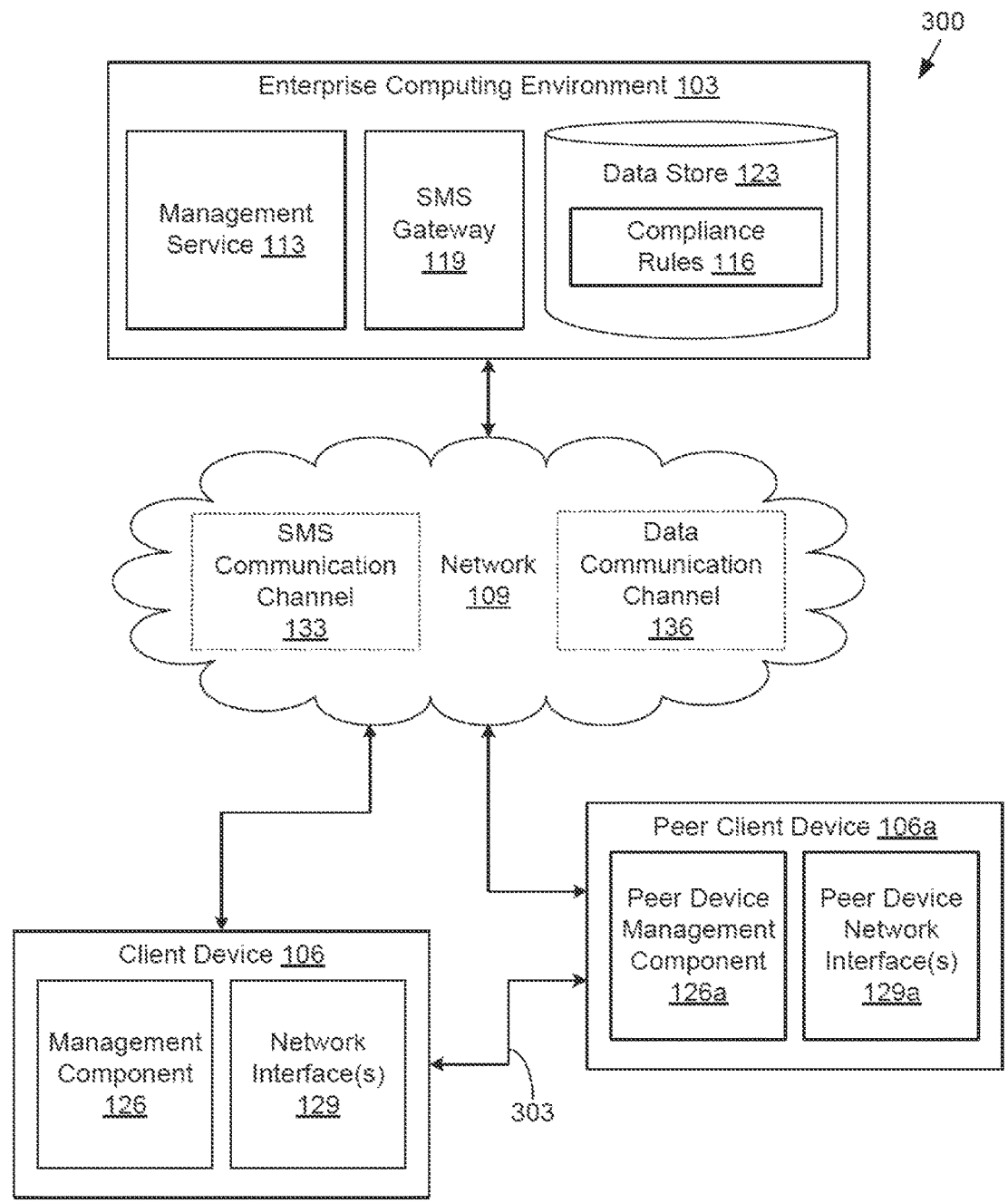
FIG. 3 is a drawing of another example of a networked environment.

With reference to FIG. 3, shown is another example of a networked environment 100, referred to herein as the networked environment 300. The networked environment 300 includes components that are similar to the components in the networked environment 100. However, the networked environment 300 further includes an additional instance of a client device 106, referred to herein as the peer client device 106*a*. The peer client device 106*a* can include a peer device management component 126*a* and one or more peer device network interfaces 129*a*. The peer device management component 126*a* can monitor and manage data, software components, and hardware components associated with the peer client device 106*a*. The peer device management component 126*a* can also identify whether the peer client device 106*a* is operating in accordance with one or more compliance rules 116 that the management service 113 has assigned to the peer client device 106*a*. The peer device management component 126*a* can also communicate with the management service 113.

A peer device network interface 129*a* can be an interlace that facilitates the peer client device 106*a* communicating through the network 109 through various communication channels, such as the SMS communication channel 133 and the data communication channel 136. A peer device network interface 129*a* can also facilitate the peer client device 106*a* communicating directly with the client device 106 through a peer-to-peer communication channel 303 without the use of intermediary devices routing traffic between the client device 106 and the peer client device 106*a*. Examples of a peer-to-peer communication channel 303 include a BLUETOOTH communication channel or a WI-FI DIRECT communication channel. The peer-to-peer communication channel 303 can be a secondary communication channel for communications between the management service 113 and the management component 126.

Next, examples of the operation of the networked environment 100 are described. To begin, the management component 126 and the management service 113 can communicate with each other through the data communication channel 136 of the network 109. For example, the management component 126 can report on the status of the client device 106, such as whether the client device 106 satisfies the compliance rules 116 that the management service 113 has assigned to the client device 106. As discussed above, the data communication channel 136 can be a primary communication channel for communications between the management component 126 and the management service 113. In this regard, the data communication channel 136 may be a preferred communication channel relative to other communications channels for communications between the management service 113 and the management component 126.

The management component 126 can detect whether there is an impediment with the data communication channel 136. Examples of an impediment include the data communication channel 136 being unavailable, the network interface 129 for the data communication channel 136 being disabled, and the data transmission or reception speed for the data communication channel 136 failing to satisfy a particular threshold speed. In some examples, the management component 126 can periodically retrieve and process parameters associated with the data communication channel 136 to determine whether an impediment exists. In other examples, the operating system of the client device 106 can notify the management component 126 that an impediment exists.

The management component 126 can also detect whether an event has occurred that should be reported to the management service 113. Examples of an event to report include the management component 126 detecting an impediment with the data communication channel 136, the client device 106 violating a compliance rule 116, a user attempting to disable the management component 126, a user removing a subscriber identity module (SIM) card from the client device 106, a user attempting to use an unapproved application, the client device 106 moving into or out of a particular geographic location, and an application being installed or uninstalled in the client device 106.

If the management component 126 has detected a reportable event, and if the management component 126 has detected an impediment with the data communication channel 136, the management component 126 can report the event to the management service 113 through the peer-to-peer communication channel 303, as will now be described. As discussed above, the peer-to-peer communication channel 303 can be a secondary communication channel for communications between the management component 126 and the management service 113.

In some examples, the management component 126 can broadcast a beacon message through the peer-to-peer communication channel 303. The beacon message can indicate that the management component 126 has detected that the management component 126 is unable to communicate with the management service 113 through the data communication channel 136. If the peer client device 106a receives the beacon message broadcast by the management component 126, the peer device management component 126a can respond to the beacon message with a message indicating that the peer device management component 126a is available to relay communications between the management component 126 and the management service 113.

In some examples, the management service 113 can detect that the management component 126 is unable to communicate with the management service 113 through the data communication channel 136. For example, the management service 113 can detect that the management component 126 has failed to respond to the management service 113, or the management service 113 can detect that the management component 126 has not communicated with the management service 113 in over a particular amount of time. In response to detecting that the management component 126 is unable to communicate with the management service 113, the management service 113 can instruct other client devices 106, such as the peer client device 106a, that are within a particular distance from the client device 106 to enable a network interface 129 for the peer-to-peer communication channel 303 and listen for a beacon message from the management component 126. The management service 113 can identify nearby devices using location data, such as global positioning system (GPS) location data or network access point data of the client devices 106 that are managed by the management service 113. In some examples, the management service 113 can identify other client devices 106 that belong to the same group, such as a location group, as the client device 106 and instruct those client devices 106 to listen for a beacon message from the management component 126. In addition, the management service 113 can instruct the peer device management component 126a to broadcast a message requesting the management component 126 to begin communicating with the peer device management component 126a.

The management component 126 can transmit an authentication message to the peer device management component 126a so that the peer device management component 126a can authenticate the client device 106 as well as messages from the management component 126. In some examples, the authentication message can include an HMAC signature that the peer device management component 126a can validate to ensure that received messages are from components associated with the enterprise computing environment 103. In addition, the authentication message can include an identifier for the client device 106 that the peer device management component 126a can validate to ensure that the client device 106 is associated with the enterprise computing environment 103. In some examples, the peer device management component 126a can communicate with the management service 113 in order to validate the identifier for the client device 106.

After the peer device management component 126a has validated the HMAC signature and the client device 106, the peer device management component 126a can transmit a communication key to the management component 126. The management component 126 and the peer device management component 126a can encrypt messages sent through the peer-to-peer communication channel 303 using the communication key so that the messages cannot be processed by unintended receivers. In some examples, the communication key can be a shared symmetric key.

After the management component 126 and the peer device management component 126a establish communication with each other, the management component 126 can transmit a message for the management service 113 to the peer device management component 126a through the peer-to-peer communication channel 303. For example, the message can report that the management component 126 has detected an event associated with the client device 106. Examples of an event that the management component 126 can report include the management component 126 detecting an impediment with the data communication channel 13, the client device 106 violating a compliance rule 116, a user attempting to disable the management component 126, a user removing a subscriber identity module (SIM) card from the client device 106, a user attempting to use an unapproved application, the client device 106 moving into or out of a particular geographic location, and an application being installed or uninstalled in the client device 106.

The message that the management component 126 transmits to the peer device management component 126a can include a hypertext transfer protocol (HTTP) request with data structured in an extensible markup language (XML) format or a JAVASCRIPT object notation (JSON) format. Messages between the management component 126 and the peer device management component 126a can also include a destination identifier that can identify the intended destination of the message. For example, if the message transmitted by the management component 126 is ultimately intended for the management service 113, the destination identifier can identify the management service 113.

The peer device management component 126a can receive the message through the peer-to-peer communication channel 303 and then relay the message to the management service 113 using another communication channel, such as the data communication channel 136 or the SMS communication channel 133. When the peer device management component 126a receives a message from the management component 126, the peer device management component 126a can extract the destination identifier to determine the particular device to winch the peer device management component 126a will relay the message. Thus, if the destination identifier identifies the management service 113, the peer device management component 126a can relay the message to the management service 113. The peer device management component 126a can also extract the data from the body of the message for forwarding to the intended destination.

In addition, the peer device management component 126a can receive messages from the management service 113 through communication channels, such as the data communication channel 136 or the SMS communication channel 133, and relay the messages to the management component 126. The messages can include a device identifiers that the peer device management component 126a can use to identify the particular client device 106 to which the peer device management component 126a should transmit the messages. The messages can, for example, instruct the management component 126 to perform various actions, as described above. Thus, using one or more of the approaches described herein, the management component 126 can use the peer-to-peer communication channel 303 to communicate with the management service 113 in times when an impediment with the data communication channel 136 exists.

Once the management component 126 and management service 113 establish communication using the peer-to-peer communication channel 303, the management component 126 can periodically transmit information associated with the client device 106 to the management service 113 through the peer-to-peer communication channel 303. For example, the management component 126 can transmit data specifying the location of the client device 106, a battery charge level for the client device 106, and a listing of applications installed in the client device 106. In some examples, the management service 113 can specify how often the management component 126 should transmit the information associated with the client device 106 to the management service 113 through the peer-to-peer communication channel 303. In addition, the management service 113 can specify the particular information that the management component 126 should provide to the management service 113.

Figure 4:
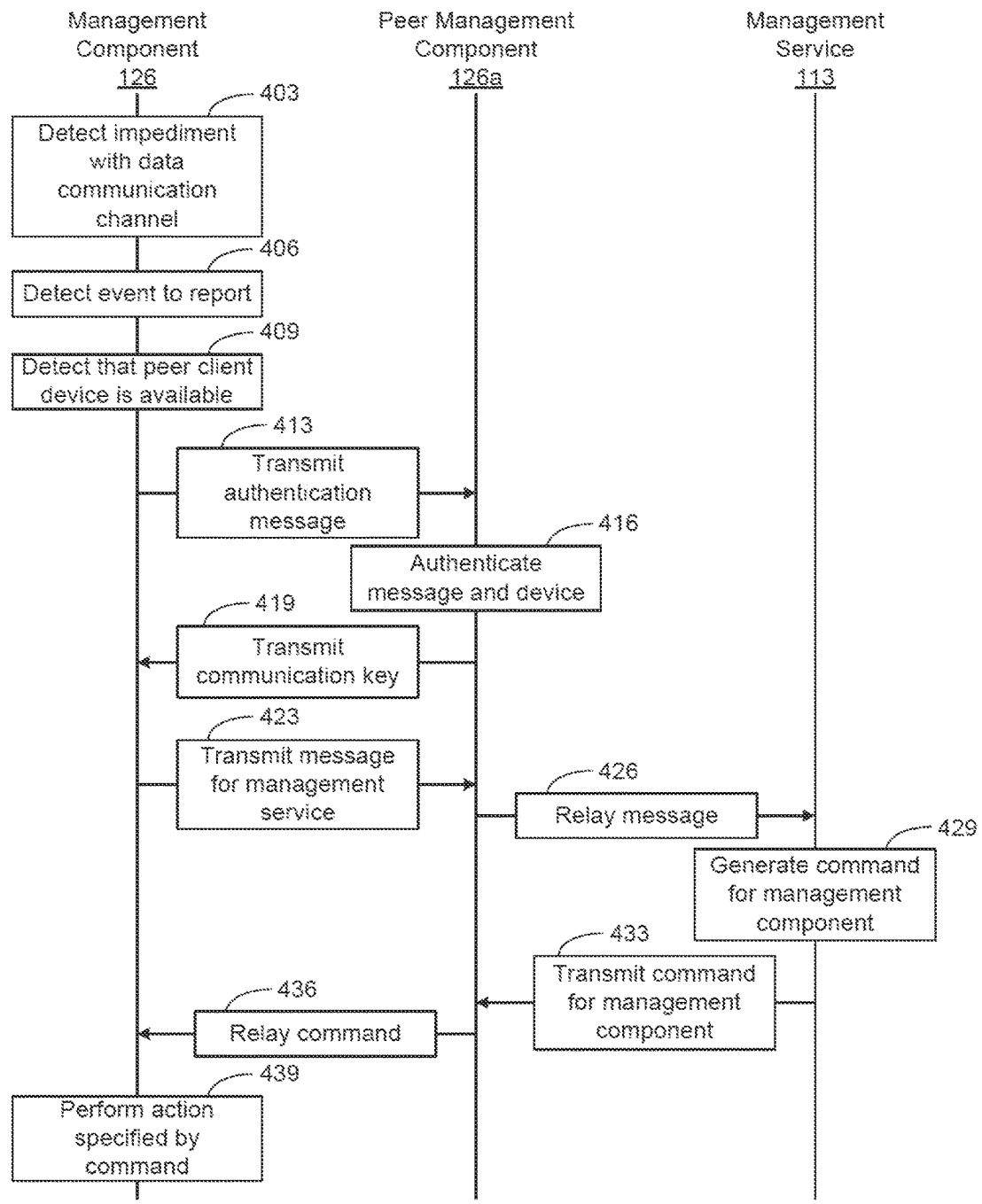
FIG. 4 is a sequence diagram illustrating another example of component interaction.

With reference to FIG. 4, shown is a sequence diagram illustrating an example of interactions of components in the networked environment 300. The sequence diagram of FIG. 4 illustrates an example of the management component 126 and the management service 113 communicating with each other through the peer-to-peer communication channel 303.

Beginning with step 403, the management component 126 can detect an impediment with the data communication channel 136. Examples of an impediment include the data communication channel 136 being unavailable, the network interface 129 for the data communication channel 136 being disabled, and the data transmission or reception speed for the data communication channel 136 failing to satisfy a particular threshold speed. In some examples, the management component 126 can periodically retrieve and process parameters associated with the data communication channel 136 to determine whether an impediment exists. In other examples, the operating system of the client device 106 can notify the management component 126 that an impediment exists.

As shown at step 406, the management component 126 can then detect an event to report to the management service 113. Examples of an event to report include the management component 126 detecting an impediment with the data communication channel 136, the client device 106 violating a compliance rule 116, a user attempting to disable the management component 126, a user removing a subscriber identity module (SIM) card from, the client device 106, a user attempting to use an unapproved application, the cheat device 106 moving into or out of a particular geographic location, and an application being installed or uninstalled in the client device 106. As in other examples, step 406 can occur before or after step 403.

In step 409, the management component 126 can detect that the peer client device 106a is available for communication through the peer-to-peer communication channel 303. In one example, the management component 126 can detect that the peer client device 106a is available by broadcasting a beacon message and then receiving a response message from the peer client device 106a, as discussed above.

The management component 126 can then transmit an authentication message to the peer device management component 126a, as shown at step 413. The authentication message can include an HMAC signature that the peer device management component 126a can validate. In addition, the authentication message can include an identifier for the client device 106.

As shown at step 416, the peer device management component 126a can then authenticate the client device 106 and the authentication message sent by the management component 126. In some examples, the peer management computing 126a can provide the device identifier to the management service 113 and request the management service 113 to determine whether the device identifier is valid.

After the peer management component 126a has authenticated the authentication message and the client device 106, the peer device management component 126a can transmit a communication key to the management component 126, as shown at step 419. The management component 126 and the peer device management component 126a can encrypt messages sent through the peer-to-peer communication channel 303 using the communication key so that the messages cannot be processed by unintended receivers. Authentication can also be two-way, allowing management component 126 to verify that peer device management component 126a is authorized and operating in accordance with compliance rules 116.

As shown at step 423, the management component 126 can then transmit a message for the management service 113 to the peer device management component 126a through the peer-to-peer communication channel 303. For example, the message can report that the management component 126 has detected an event associated with the client device 106. Examples of an event that the management component 126 can report include the management component 126 detecting an impediment with the data communication channel 136, the client device 106 violating a compliance rule 116, a user attempting to disable the management component 126, a user removing a subscriber identity module (SIM) card from the client device 106, a user attempting to use an unapproved application, the client device 106 moving into or out of a particular geographic location, and an application being installed or uninstalled in the client device 106. The message can also be encrypted so that the peer device management component 126a cannot determine the message contents.

As discussed above, the message transmitted to the peer management component 126a can include a device identifier that the peer device management component 126a can use to identify that the peer device management component 126a should transmit the message to the management service 113. In addition, the message can include a proxy header for the management service 113.

At step 426, the peer device management component 126a can relay the received message to the management service 113 through another communication channel, such as the data communication channel 136 or the SMS communication channel 133.

Once the management service 113 receives the relayed message, the management service 113 can decrypt the message and generate a command for the management component 126, as indicated at step 429. Additionally, the management service 113 can parse the proxy header generated by the management component 126 to identify that the management component 126 is the originator of the message and that the peer management component 126a is being used as a relay for communications. As discussed above, the command generated at step 429 can instruct the management component 126 to perform an action in response to the event that the management component 126 detected. In addition, the management service 113 can store a mapping of the peer client device 106a to the client device 106 so that the management service 113 knows that future messages for the client device 106 should be transmitted to the peer client device 106a for relaying.

The management service 113 can then move to step 433 and transmit the command for the management component 126 to the peer device management component 126a. The management service 113 can transmit the command through various communication channels, such as the SMS communication channel 133 or the data communication channel 136. The message containing the command can also be encrypted to prevent access by the peer device management component 126a, other than information need to route the message. In addition, the message can include a proxy header so that the peer management component 126 a can know to relay the message to the management component 126.

When the peer device management component 126a receives the command, the peer management component 126a can relay the command to the management component 126, as shown at step 436. In particular, the peer device management component 126a can transmit the command to the management component 126 through the peer-to-peer communication channel 303.

When the management component 126 receives the command, the management component 126 can perform an action specified by the command, as shown at step 439. Examples of actions that the management component 126 can perform include locking the client device 106, applying new compliance rules 116 or a new compliance profile, erasing data in the client device 106, rendering a message in a user interface, installing or uninstalling a particular application, performing a device reset, clearing a device passcode, modifying a passcode, restarting the client device 106, unenrolling the client, device 106 from service with the management service 113, erasing data in the client device 106, rendering a message in a user interface, and notifying the management service 113 of the location of the client device 106. The management component 126 can also transmit a message to the management service 113 through the peer management component 126a that specifies whether the management component 126 complied with the command.

Figure 5:
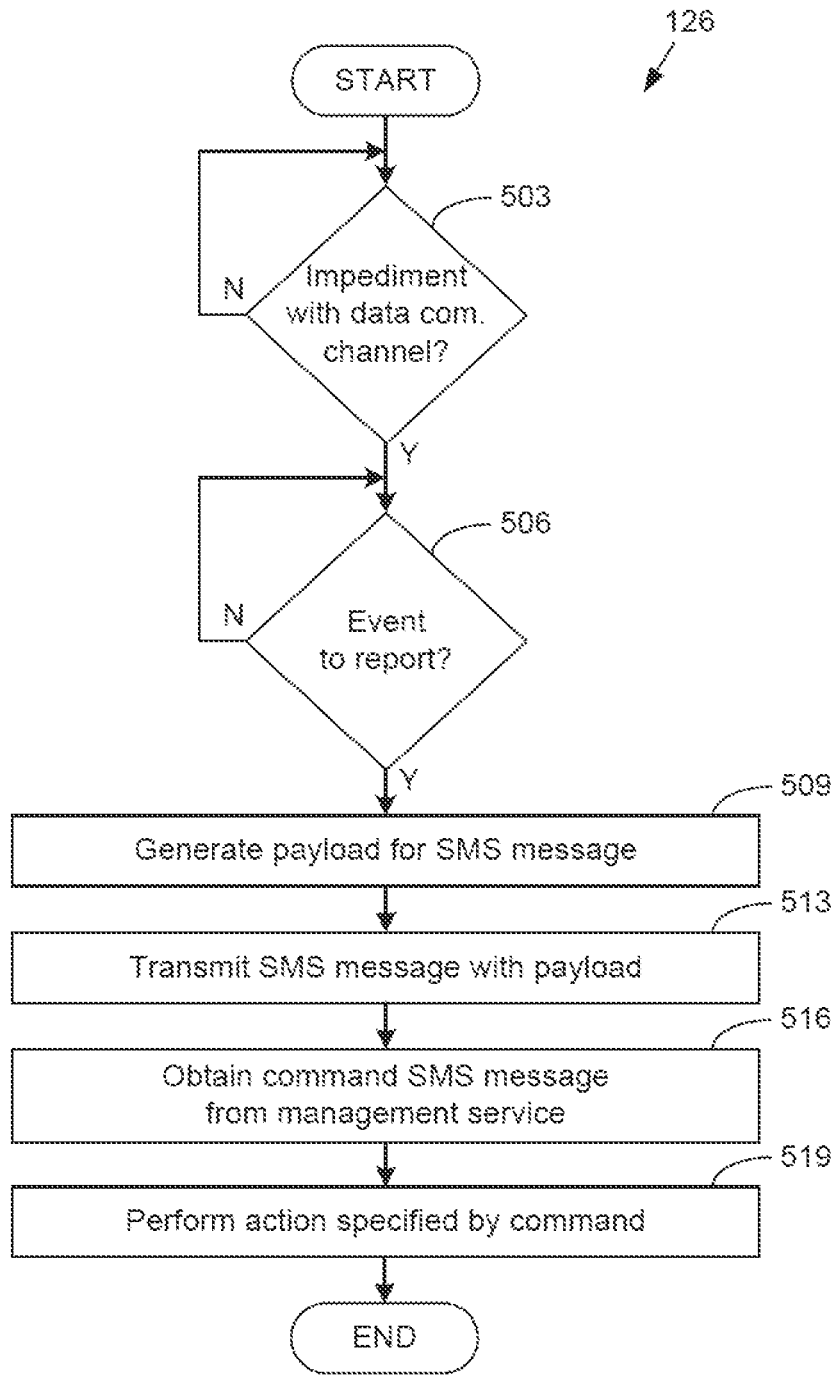
FIGS. 5 and 6A-6B are flowcharts illustrating examples of functionality implemented by a management component in a client device.

With reference to FIG. 5, shown is a flowchart that provides an example of a portion of the operation of the management component 126. In particular, FIG. 5 provides an example of the management component 126 communicating with the management service 113 through the SMS communication channel 133. The flowchart of FIG. 5 can be viewed as depicting an example of a method implemented in the client device 106.

Beginning with step 503, management component 126 can detect whether there is an impediment with the data communication channel 136. In some examples, the management component 126 can obtain parameters associated with the data communication channel 136 to determine whether an impediment exists. In other examples, the operating system of the client device 106 can notify the management component 126 that an impediment exists with the data communication channel 136.

Once the management component 126 detects an impediment with the data communication channel 136, the management component 126 can move to step 506 and detect whether there is an event to report to the management service 113. Examples of an event to report include the management component 126 defecting an impediment with the data communication channel 136, the client device 106 violating a compliance rule 116, a user attempting to disable the management component 126, a subscriber identity module (SIM) card being removed from the client device 106, a user attempting to use an unapproved application, the client device 106 moving into a restricted geographic location, and an application being installed or uninstalled in the client device 106. Step 506 can also be performed before step 503.

Once the management component 126 detects an event to report, the management component 126 can move to step 509 and generate a payload for one or more SMS messages. The payload can specify the event that the management component 126 detected. In addition, the payload can be encrypted. In addition, the payload can include a message sequence portion that can specify the total number of SMS messages that the management component 126 will transmit as a sequence to report the detected event, as well as identifiers that specify where in the sequence the respective SMS messages are located.

As shown at step 513, the management component 126 can transmit the SMS message with the generated payload through the SMS communication channel 133. As discussed above, the SMS communication channel 133 can be a secondary communication channel for communications between the management component 126 and the management service 113.

The management component 126 can then obtain an SMS message sent from the management service 113 as shown at step 516. The command can specify an action for the management component 126 to perform. In addition, the command SMS message can include a timestamp or specify an expiration time for the validity of the command, as described above.

As indicated at step 519, the management component 126 can then perform the action specified by the command. Examples of actions that the management component 126 can perform include locking the client device 106, applying new compliance rules 116 or a new compliance profile, erasing date in the client device 106, rendering a message in a user interface, installing or uninstalling a particular application, performing a device reset, clearing a device passcode, modifying a passcode, restarting the client device 106, unenrolling the client device 106 from service with the management service 113, erasing data in the client device 106, rendering a message in a user interface, and notifying the management service 113 of the location of the client device 106. Thus, as described above, the management component 126 can notify the management service 113 of an event by communicating through a secondary communication channel. In addition, the management service 113 can command the management component 126 to perform an action in response to the event by communicating through the secondary communication channel. Thereafter, the process can end.

Figure 6A:
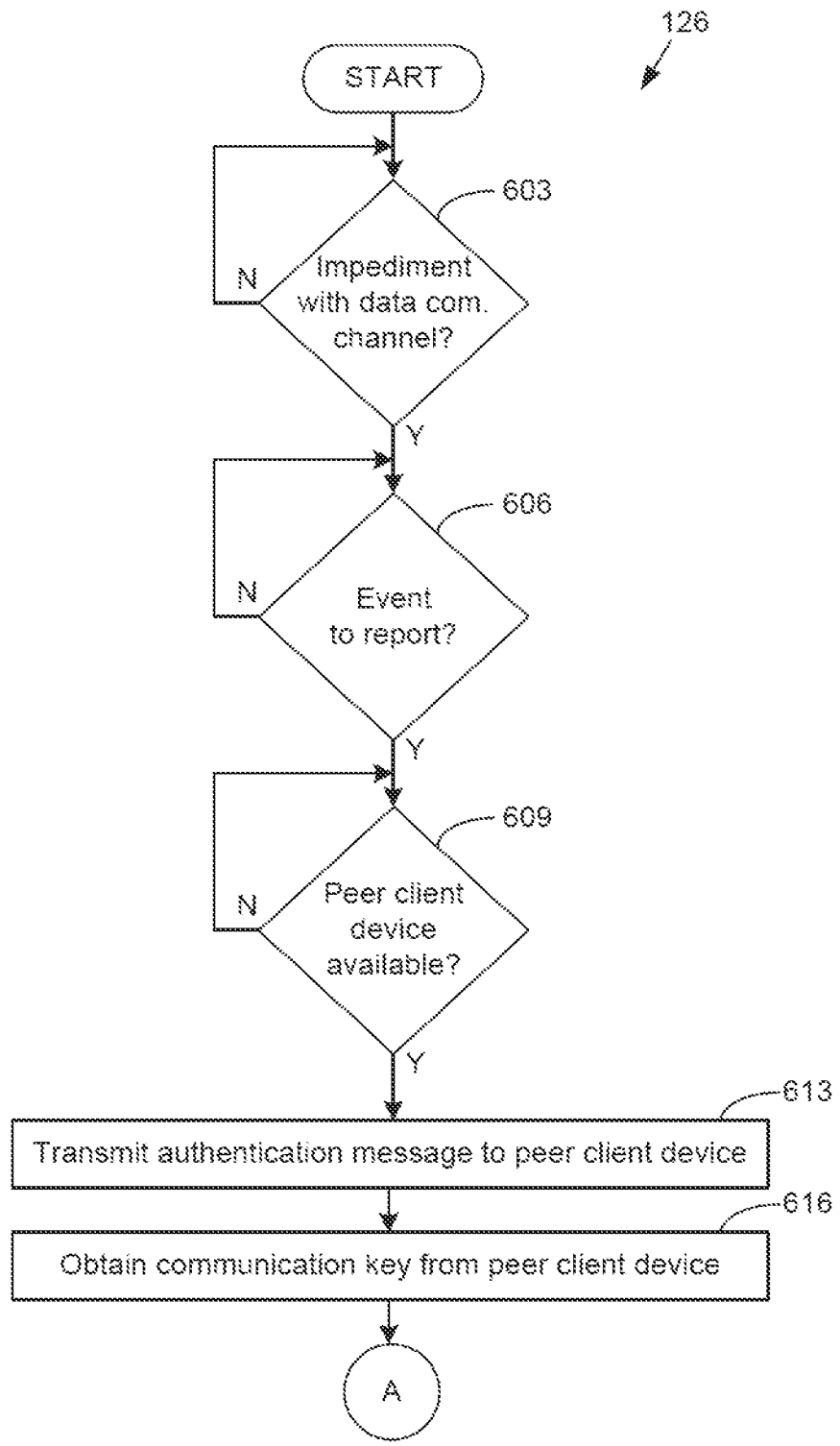
Figure 6B:
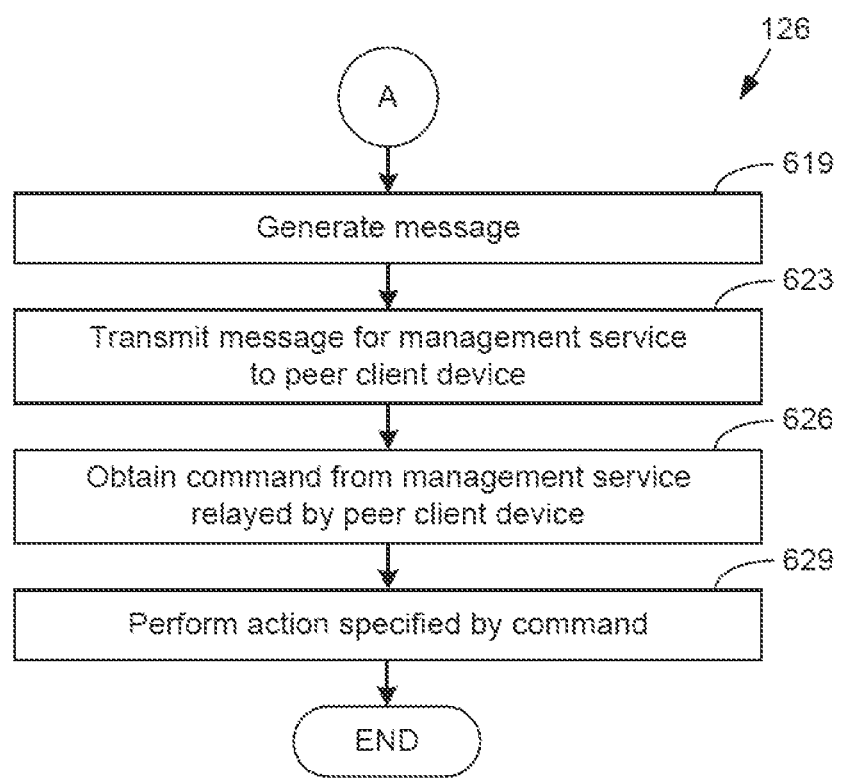

With reference to FIGS. 6A-6B, shown is a flowchart that provides another example of a portion of the operation of the management component 126. In particular, FIGS. 6A-6B provide an example of the management component 126 communicating with the management service 113 through the peer-to-peer communication channel 303. The flowchart of FIGS. 6A-6B can be viewed as depicting an example of a method implemented in the client device 106.

Beginning with step 603, management component 126 can detect whether there is an impediment with the data communication channel 136. In some examples, the management component 126 can obtain parameters associated with the data communication channel 136 to determine whether an impediment exists. In other examples, the operating system of the client device 106 can notify the management component 126 that an impediment exists with the data communication channel 136.

Once the management component 126 detects an impediment with the data communication channel 136, the management component 126 can move to step 606 and detect whether there is an event to report to the management service 113. Examples of an event to report include the management component 126 detecting an impediment with the data communication channel 136, the client device 106 violating a compliance rule 116, a user attempting to disable the management component 126, a user removing a subscriber identity module (SIM) card from the client device 106, a user attempting to use an unapproved application, the client device 106 moving into a restricted geographic location, and an application being installed or uninstalled in the client device 106. Steps 603 and 606 can be performed in any order.

In response to detecting an event to report, the management component 126 can detect whether the peer client device 106a is available for relaying communications between the management component 126 and the management service 113. In some examples, the management component 126 can broadcast a beacon message, as described above, and determine that the peer client device 106a is available upon receiving a responsive message from the peer client device 106a.

As shown at step 613, the management component 126 can then transmit an authentication message to the peer device. The authentication message can include an identifier for the client device 106 and an HMAC signature so that the peer device management component 126a can authenticate the client device 106 and messages from the management component 126.

The management component 126 can then obtain a communication key from the peer client device 106a, as shown at step 616. The communication key can be used to encrypt messages between the management component 126 and the peer device management component 126a so that other devices cannot process the messages.

The management component 126 can then move to step 619, which is show in FIG. 6B. At step 619, the management component 126 can generate a message for the management service 113. The message can, for example, specify the event that the management component 126 detected.

At step 623, the management component 126 can transmit the generated message to the peer client device 106a. In particular, the management component 126 can transmit the message to the peer client device 106a through the peer-to-peer communication channel 303. As described above, the peer-to-peer communication channel 303 can be a secondary communication channel for communications between the management component 126 and the management service 113.

As indicated at step 626, the management component 126 can then obtain a command from the management service 113 that the peer client device 106a relayed to the management component 126. In particular, the peer device management component 126a can relay the command through the peer-to-peer communication channel 303. The command can specify an action for the management component 126 to perform. In addition, the command can include a timestamp or specify an expiration time for the validity of the command, as described above.

The management component 126 can then move to step 629 and perform the action specified by the command. Examples of actions that the management component 126 can perform include locking the client device 106, applying new compliance rules 116 or a new compliance profile, erasing data in the client device 106, rendering a message in a user interface, installing or uninstalling a particular application, performing a device reset, clearing a device passcode, modifying a passcode, restarting the client device 106, unenrolling the client device 106 from service with the management service 113, erasing data in the client device 106, rendering a message in a user interface, and notifying the management service 113 of the location of the client device 106. Thereafter, the process can end.

Figure 7A:
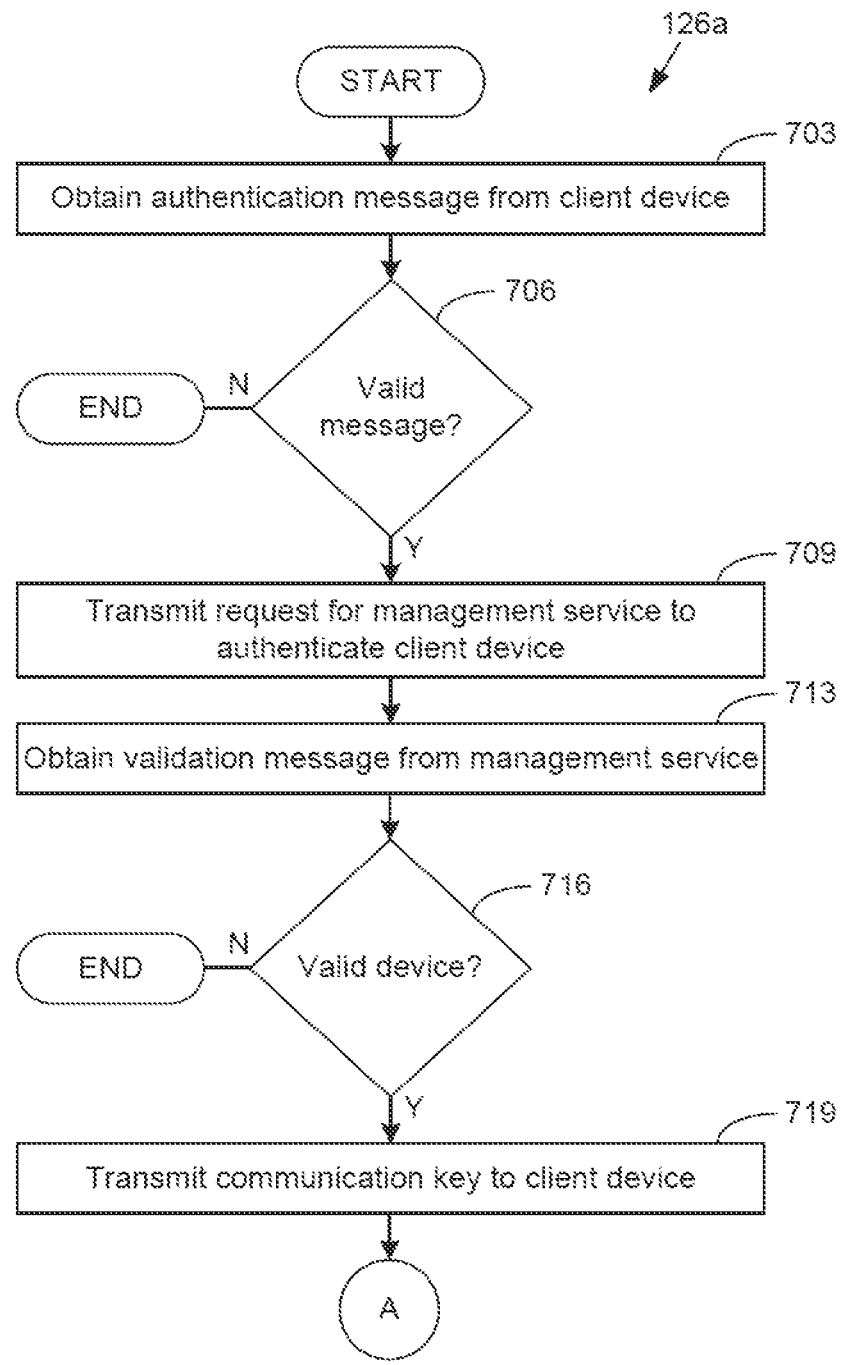
FIGS. 7A-7B is a flowchart illustrating an example of functionality implemented by a peer management component in a peer client device.
Figure 7B:
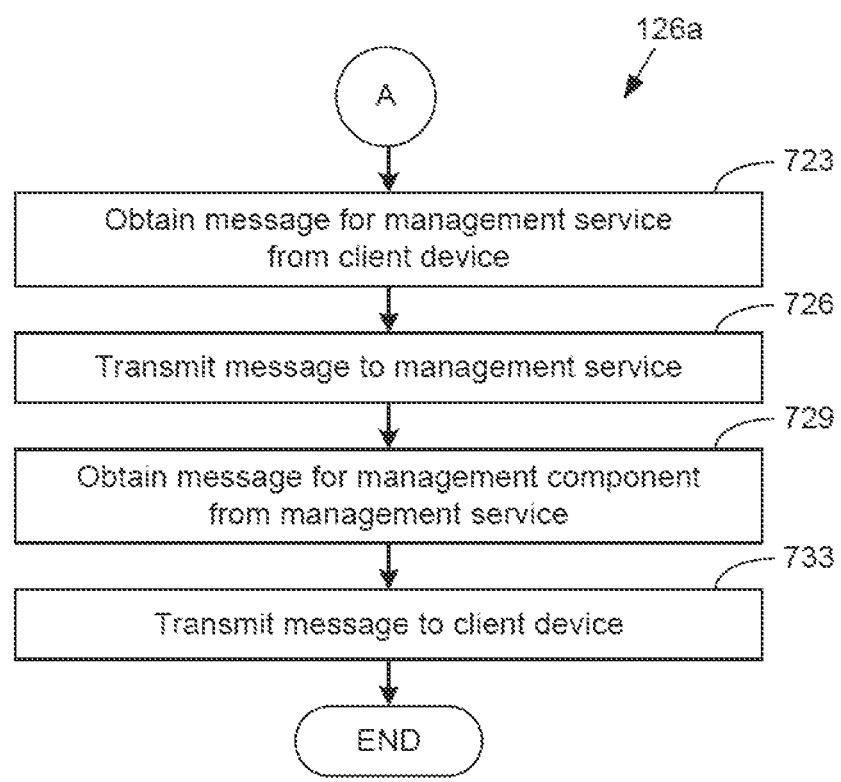

With reference to FIGS. 7A-7B, shown is a flowchart that provides an example of a portion of the operation of the peer device management component 126a. In particular, FIGS. 7A-7B provide an example of the peer device management component 126a communicating with the management component 126 through the peer-to-peer communication channel 303. The flowchart of FIGS. 7A-7B can be viewed as depicting an example of a method implemented in the peer client device 106a.

Beginning with step 703, the peer device management component 126a can obtain an authentication message from the client device 106. The authentication message can include an identifier for the client device 106 and an HMAC signature.

At step 706, the peer device management component 126a can determine whether the authentication message is valid. To this end, the peer device management component 126a can determine whether the HMAC signature is authentic. If the authentication message is not valid, the process can end, as shown in FIG. 7A.

If the peer device management component 126a determines that the authentication message is valid, the peer device management component 126a can move to step 709 and transmit a message to the management service 113 requesting the management service to authenticate the client device 106 based on the device identifier included in the authentication message. At step 713, the peer device management component 126a can obtain a validation message from the management service 113. The validation message can specify whether the management service 113 determined that the client device 106 is a valid device being managed by the management service 113.

If the validation message specifies that the client device 106 is not a valid device, the process can end, as shown in FIG. 7A. Otherwise, if the validation message specifies that the client device 106 is a valid device, the peer device management component 126a can move to step 719 and transmit a communication key to the client device 106. The communication key can be used to encrypt messages between the management component 126 and the peer device management component 126a so that other devices cannot process the messages.

The peer device management component 126a can then move to step 723, which is shown in FIG. 7B. At step 723, the peer device management component 126a can then obtain a message for the management service 113 from the client device 106. The message can specify an event that the management component 126 detected in the client device 106, and the peer device management component 126a can obtain the messages through the peer-to-peer communication channel 303.

As shown at step 726, the peer device management component 126a can then transmit the message to the management service 113 through various communication channels. For example, the peer device management component 126a can transmit the message to the management service 113 through the data communication channel 136 or the SMS communication channel 133 using one or more of the techniques discussed above.

The peer device management component 126a can then obtain a message for the management component 126 from the management service 113, as indicated at step 729. The peer device management component 126a can obtain the message through the data communication channel 136 or the SMS communication channel 133. As shown at step 733, the management component 113 can transmit the message to the client device 106 through the peer-to-peer communication channel 303. Thereafter, the process can end.

The sequence diagrams and flowcharts of FIGS. 2, 4, 5, 6A-6B, and 7A-7B show examples of the functionality and operation of implementations of components described herein. The components of the networked environments 100 and 300 described herein can be embodied in hardware, software, or a combination of hardware and software. If embodied in software, each step in the sequence diagrams and flowcharts of FIGS. 2, 4, 5, 6A-6B, and 7A-7B can represent a module or a portion of code that includes computer instructions to implement the specified logical functions. The computer instructions can include source code that comprises human-readable statements written in a programming language or machine code that comprises machine instructions recognizable by a suitable execution system, such as a processor in a computer system. If embodied in hardware, each step can represent a circuit or a number of interconnected circuits that implement the specified logical functions.

Although the sequence diagrams and flowcharts show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The enterprise computing environment 103, client device 106, and peer client device 106a can include at least one processing circuit. Such a processing circuit can include one or more processors; and one or more storage devices that are coupled to a local interface. The local interface can include a data bus with an accompanying address/control bus.

A storage device for a processing circuit can store data and components that are executable by the one or more processors of the processing circuit. In some examples, portions of the management service 113, the management component 126, and the peer device management component 126a can be stored in one or more storage devices and be executable by one or more processors. Also, the data store 123 can be located in the one or more storage devices.

The management service 113, the management component 126, and the peer device management component 126a can be embodied in the form of hardware, as software components that are executable by hardware, or as a combination of software and hardware. If embodied as hardware, the components described herein can be implemented as a circuit or state machine that employs any suitable hardware technology. Such hardware technology includes, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. Such a computer-readable medium can contain, store, and maintain the software and computer instructions for use by or in connection with the instruction execution system.

A computer-readable medium can comprise a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All such modifications and variations are intended to be included herein within the scope of this disclosure.

Therefore, the following is claimed:

1. A method, comprising:
   detecting an impediment with a data communication channel for a client device of a particular enterprise, wherein the data communication channel is a primary communication channel through which the client device communicates with a management service;
   detecting an event comprising a violation of a compliance rule associated with the client device to report to the management service;
   detecting availability of a peer device based at least in part on receiving, from the peer device, a beacon response message comprising an indication that the peer device is available to relay communications between the client device and the management service;
   transmitting, through a peer-to-peer communication channel between the client device and the peer device, an event message specifying the violation of the compliance rule, wherein the peer device relays the event message from the client device to the management service;
   receiving, through the peer-to-peer communication channel between the client device and the peer device, a command to perform a device management action comprising erasing data from the client device based at least in part on the violation of the compliance rule, wherein the peer device relays the command from the management service to the client device; and
   performing the device management action specified by the command.

2. The method of claim 1, further comprising:
   broadcasting, by the client device, a beacon message comprising an indication that the client device is unable to communicate with the management service.

3. The method of claim 2, wherein the command comprises a timestamp and an expiration time for the command to perform the device management action.

4. The method of claim 3, further comprising determining whether a time of validity for the command has expired based at least in part on the timestamp and the expiration time for the command.

5. The method of claim 1, wherein the event message is encrypted based on a communication key received from the peer device.

6. The method of claim 5, wherein the communication key is received in response to an authentication message transmitted by the client device to the peer device through the peer-to-peer communication channel.

7. The method of claim 6, wherein the authentication message comprises an HMAC signature, and the HMAC signature is validated by at least one of: the peer device, and the management service.

8. A non-transitory computer-readable medium embodying a plurality of computer instructions executable by a computing device, wherein the plurality of computer instructions, upon execution, cause the computing device to at least:
   detect an impediment with a data communication channel for a client device associated with a particular enterprise, wherein the data communication channel is a primary communication channel through which the client device communicates with a management service;
   detect an event comprising a violation of a compliance rule associated with the client device to report to the management service;
   detect availability of a peer device based at least in part on receiving, from the peer device, a beacon response message comprising an indication that the peer device is available to relay communications between the client device and the management service;
   transmit, through a peer-to-peer communication channel between the client device and the peer device, an event message specifying the violation of the compliance rule, wherein the peer device relays the event message from the client device to the management service;
   receive, through the peer-to-peer communication channel between the client device and the peer device, a command to perform a device management action comprising erasing data from the client device based at least in part on the violation of the compliance rule, wherein the peer device relays the command from the management service to the client device; and
   perform the device management action specified by the command.

9. The non-transitory computer-readable medium of claim 8, wherein the plurality of computer instructions, upon execution, further cause the computing device to at least:
   broadcast, by the client device, a beacon message comprising an indication that the client device is unable to communicate with the management service.

10. The non-transitory computer-readable medium of claim 9, wherein the command comprises a timestamp and an expiration time for the command to perform the device management action.

11. The non-transitory computer-readable medium of claim 10, wherein the plurality of computer instructions further cause the computing device to at least determine whether a time of validity for the command has expired based at least in part on the timestamp and the expiration time for the command.

12. The non-transitory computer-readable medium of claim 8, wherein the event message is encrypted based on a communication key received from the peer device.

13. The non-transitory computer-readable medium of claim 12, wherein the communication key is received in response to an authentication message transmitted by the client device to the peer device through the peer-to-peer communication channel.

14. The non-transitory computer-readable medium of claim 13, wherein the authentication message comprises an HMAC signature, and the HMAC signature is validated by at least one of: the peer device, and the management service.

15. A system, comprising:
   a computing device;
   a plurality of computer instructions executable by the computing device, wherein the computer instructions, upon execution, cause the computing device to at least:
      detect an impediment with a data communication channel for a client device associated with a particular enterprise, wherein the data communication channel is a primary communication through which the client device communicates with a management service;
      detect an event comprising a violation of a compliance rule associated with the client device to report to the management service;
      detect availability of a peer device based at least in part on receiving, from the peer device, a beacon response message comprising an indication that the peer device is available to relay communications between the client device and the management service;
      transmit, through the peer-to-peer communication channel between the client device and the peer device, a command to perform a device management action comprising erasing data from the client device based at least in part on the violation of the compliance rule, wherein the peer device relays the command from the management service to the client device;
      receive, through the peer-to-peer communication channel between the client device and the peer device, a command to perform a device management action comprising erasing data from the client device based at least in part on the violation of the compliance rule, wherein the peer device relays the command from the management service to the client device; and
      perform the device management action specified by the command.

16. The system of claim 15, wherein the plurality of computer instructions, upon execution, further cause the computing device to at least:
   broadcast, by the client device, a beacon message comprising an indication that the client device is unable to communicate with the management service.

17. The system of claim 16, wherein the command comprises a timestamp and an expiration time for the command to perform the device management action.

18. The system of claim 17, wherein the plurality of computer instructions further cause the computing device to at least determine whether a time of validity for the command has expired based at least in part on the timestamp and the expiration time for the command.

19. The system of claim 15, wherein the event message is encrypted based on a communication key received from the peer device.

20. The system of claim 19, wherein the communication key is received in response to an authentication message transmitted by the client device to the peer device through the peer-to-peer communication channel.

\* \* \* \* \*